(12) United States Patent
Wu et al.

(10) Patent No.: US 7,403,654 B2
(45) Date of Patent: Jul. 22, 2008

(54) ENHANCED AUTOMATIC RED EYE REMOVAL

(75) Inventors: Donghui Wu, Fremont, CA (US);
Zhenyu Yang, Hangzhou (CN); Yushan Huang, Zhejiang (CN)

(73) Assignee: ArcSoft, Inc., Fremont, CA (US)

( * ) Notice: Subject to any disclaimer, the term of this patent is extended or adjusted under 35 U.S.C. 154(b) by 663 days.

(21) Appl. No.: 10/958,884

(22) Filed: Oct. 4, 2004

(65) Prior Publication Data
US 2006/0072815 A1 Apr. 6, 2006

(51) Int. Cl.
*G06K 9/00* (2006.01)
(52) U.S. Cl. .................................... 382/167
(58) Field of Classification Search ............... 382/117, 382/165, 167, 275; 396/155, 158; 358/518; 345/591; 348/223.1, 224.1, 225.1, 370, 576
See application file for complete search history.

(56) References Cited

U.S. PATENT DOCUMENTS

| | | | | |
|---|---|---|---|---|
| 6,009,209 | A * | 12/1999 | Acker et al. ............... | 382/275 |
| 6,204,858 | B1 | 3/2001 | Gupta | |
| 6,407,777 | B1 | 6/2002 | DeLuca | |
| 6,714,665 | B1 | 3/2004 | Hanna et al. | |
| 6,718,051 | B1 * | 4/2004 | Eschbach .................. | 382/117 |
| 6,728,401 | B1 * | 4/2004 | Hardeberg ................. | 382/167 |
| 6,798,903 | B2 * | 9/2004 | Takaoka .................... | 382/167 |
| 6,873,743 | B2 * | 3/2005 | Steinberg .................. | 382/275 |
| 6,895,112 | B2 * | 5/2005 | Chen et al. ................ | 382/167 |
| 7,027,662 | B2 * | 4/2006 | Baron ....................... | 382/275 |
| 7,035,461 | B2 | 4/2006 | Luo et al. | |
| 7,035,462 | B2 * | 4/2006 | White et al. ............... | 382/167 |
| 7,042,505 | B1 | 5/2006 | DeLuca | |
| 7,062,086 | B2 * | 6/2006 | Chen et al. ................ | 382/165 |
| 7,088,855 | B1 * | 8/2006 | Vide ......................... | 382/167 |
| 7,116,820 | B2 * | 10/2006 | Luo et al. .................. | 382/167 |
| 7,155,058 | B2 | 12/2006 | Gaubatz et al. | |
| 7,171,044 | B2 * | 1/2007 | Chen et al. ................ | 382/165 |
| 7,224,850 | B2 * | 5/2007 | Zhang et al. .............. | 382/275 |
| 2002/0176623 | A1 | 11/2002 | Steinberg | |

(Continued)

OTHER PUBLICATIONS

Ming-Hsuan Yang and David J. Kriegman, "Detecting Faces in Images: A Survey," IEEE Trans. on Pattern Analysis and Machine Intelligence, vol. 24, No. 1, Jan. 2002.

(Continued)

*Primary Examiner*—Jose L. Couso
(74) *Attorney, Agent, or Firm*—Patent Law Group LLP; David C. Hsia (57) ABSTRACT

A method for removing red eyes includes (1) identifying potential red eye pixels in a low resolution image (hereafter "LR red eye pixels"), (2) grouping contiguous LR red eye pixels into red eye regions (herafter "LR red eye regions"), (3) determining working areas around the LR red eye regions (hereafter "LR working areas"), (4) determining classifiers from the LR working areas, (5) retrieving working areas from a high resolution image that correspond to the LR working areas (hereafter "HR working areas"), (6) applying the classifiers to the HR working areas to identify potential red eye pixels (hereafter "HR red eye pixels"), (7) grouping contiguous HR red eye pixels into red eye regions (hereafter "HR red eye regions"), (8) determining some of the HR red eye regions as the red eyes, and (9) replacing the HR red eye pixels in the red eyes with black pixels.

16 Claims, 9 Drawing Sheets

U.S. PATENT DOCUMENTS

| | | |
|---|---|---|
| 2004/0240747 A1 | 12/2004 | Jarman et al. |
| 2005/0047656 A1 | 3/2005 | Luo et al. |
| 2005/0196067 A1 | 9/2005 | Gallagher et al. |
| 2005/0232481 A1 | 10/2005 | Donghui Wu |

OTHER PUBLICATIONS

Arturo de la Escalera and Miguel Angel Salichs, "Road Traffic Sign Detection and Classification," IEEE Trans. on Industrial Electronics, vol. 44, No. 6, Dec. 1997.

* cited by examiner

ENHANCED AUTOMATIC RED EYE REMOVAL

CROSS REFERENCE TO RELATED APPLICATIONS

This application is related to U.S. application Ser. No. 10/826,108, entitled "AUTOMATIC RED EYE REMOVAL," filed Apr. 16, 2004, which is commonly assigned and incorporated by reference in its entirety.

FIELD OF INVENTION

This invention relates to a method for red eye removal in photographs and images.

DESCRIPTION OF RELATED ART

The pupil is an opening that lets light into the eye. Since most of the light entering the eye does not escape, the pupil appears black. In dim light, the pupil expands to allow more light to enter the eye. In bright light, the pupil contracts to allow less light to enter the eye.

"Red eye" is a phenomenon where a person's pupils appear red in a photograph taken with a flash. Red eye comes from light reflecting off of the blood vessels in the retinas (on the back interior of the eyeballs).

Some cameras have a "red eye reduction" feature. In these cameras, the flash goes off twice—once right before the picture is taken, and then again to actually take the picture. The first flash causes people's pupils to contract, thereby reducing red eye significantly.

Some photography software have a "red eye removal" feature. These software require the user to identify the red eye, usually by dragging a rectangular box around the red eye with a mouse, and then remove red eye from the specified area. Others software, such as those available from Pixology of Guildford, England, and FotoNation of San Francisco, Calif., require little or no user intervention and the software identifies the red eye automatically.

In addition, there are literatures that describe methods for red eye removal. Of particular interest is U.S. Patent Application Publication 2002/0176623, filed Mar. 29, 2002 ("Steinberg"). Steinberg describes a 3-step process: (1) search candidate areas by color constraints; (2) eliminate candidates with shape and other criteria; and (3) output the results for user interactive verification of the red eye candidates. However, this process has been widely used and is processing common sense.

For example, in an article by de la Escalera et al., a process for detecting road traffic signs is disclosed. de la Escalera et al., "Road Traffic Sign Detection and Classification," IEEE Trans. on Industrial Electronics, Vol. 44, No. 6, December 1997. de la Escalera et al. discloses two steps: (1) localize the sign in the image depending on the color and the form; and (2) recognize the sign through a neural network.

In another example, in an article by Yang et al., a process for face detection is disclosed. "Detecting Faces in Images; A Survey," Yang et al., IEEE Trans. on Pattern Analysis and Machine Intelligence, Vol. 24, No. 1, January 2002. Yang et al. states, "Most of [software] utilize global features such as skin color, size, and shape to find face candidates, and then verify these candidates using local, detailed features such as eye brows, nose, and hair. A typical approach begins with the detection of skin-like regions. Next, skin-like pixels are grouped together using connected component analysis or clustering algorithms. If the shape of a connected region has an elliptic or oval shape, it becomes a face candidate. Finally, local features are used for verification." Id. at p. 40.

BRIEF DESCRIPTION OF THE DRAWINGS

Use of the same reference numbers in different figures indicates similar or identical elements.

SUMMARY

In one embodiment of the invention, a method for removing red eyes includes (1) identifying potential red eye pixels in a low resolution image generated from a high resolution image (hereafter "LR red eye pixels"), (2) grouping contiguous LR red eye pixels into red eye regions (herafter "LR red eye regions"), (3) determining working areas around the LR red eye regions (hereafter "LR working areas"), (4) determining classifiers from the LR working areas, (5) retrieving working areas from the high resolution image that correspond to the LR working areas (hereafter "HR working areas"), (6) applying the classifiers to the HR working areas to identify potential red eye pixels (hereafter "HR red eye pixels"), (7) grouping contiguous HR red eye pixels into red eye regions (hereafter "HR red eye regions"), (8) determining some of the HR red eye regions as the red eyes, and (9) replacing the HR red eye pixels in the red eyes with black pixels. By doing some of the processing involved in red eye removal on the low resolution image, the number of computational steps is reduced and the required memory used in these computational steps is also reduced.

DETAILED DESCRIPTION

Figure 1:
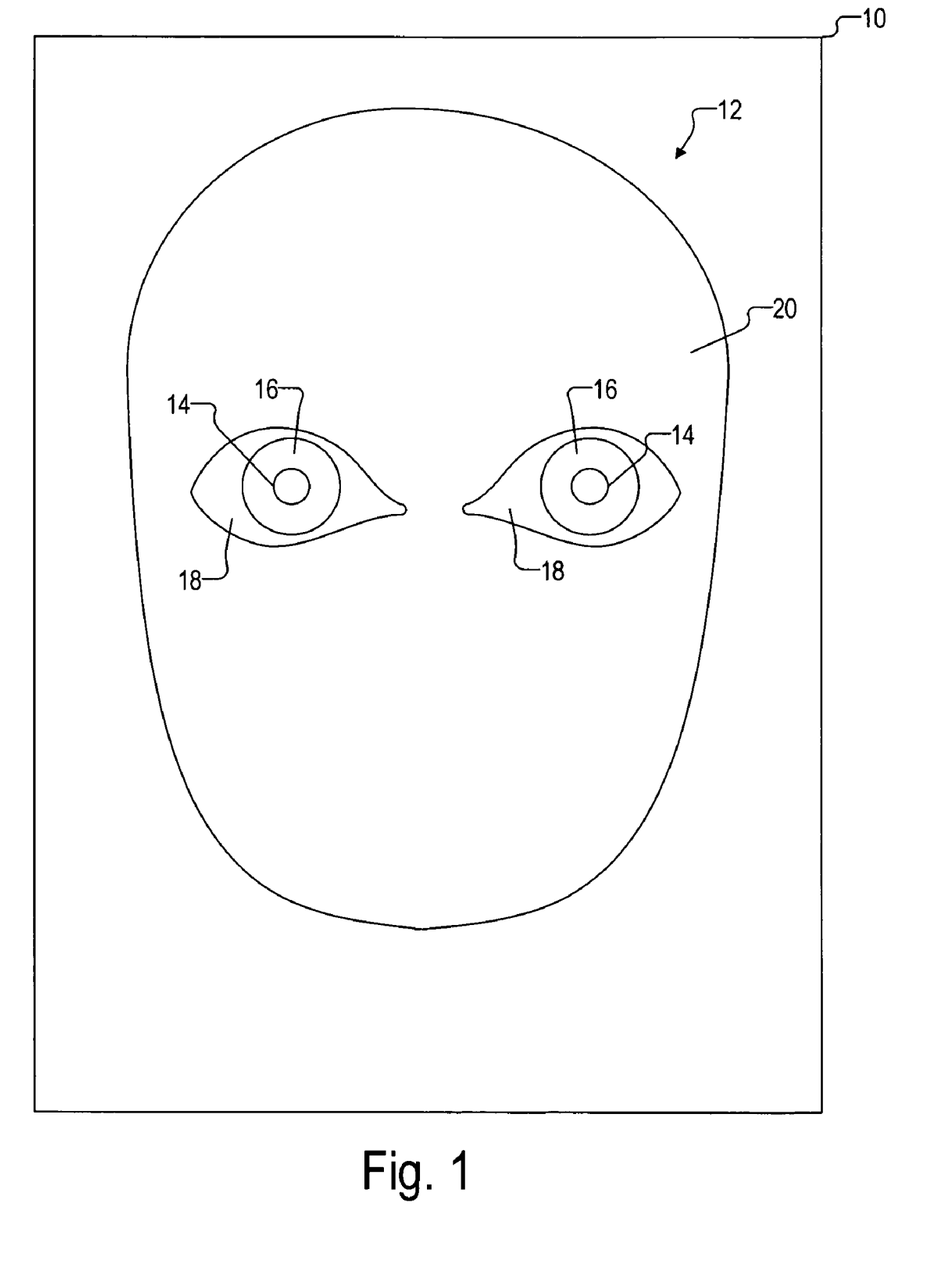
FIG. 1 illustrates an image with red eye in one embodiment of the invention.

FIG. 1 illustrates an image 10 of a person 12 having pupils 14, eyes 16, scleras 18, and face 20 in one embodiment of the invention. In a phenomenon called "red eye," pupils 14 appear red when light reflects off of the blood vessels in back interior of the eyeballs. It has been experimentally determined that a red eye typically consists of pixels that are purple-red or orange-red.

Figure 2:
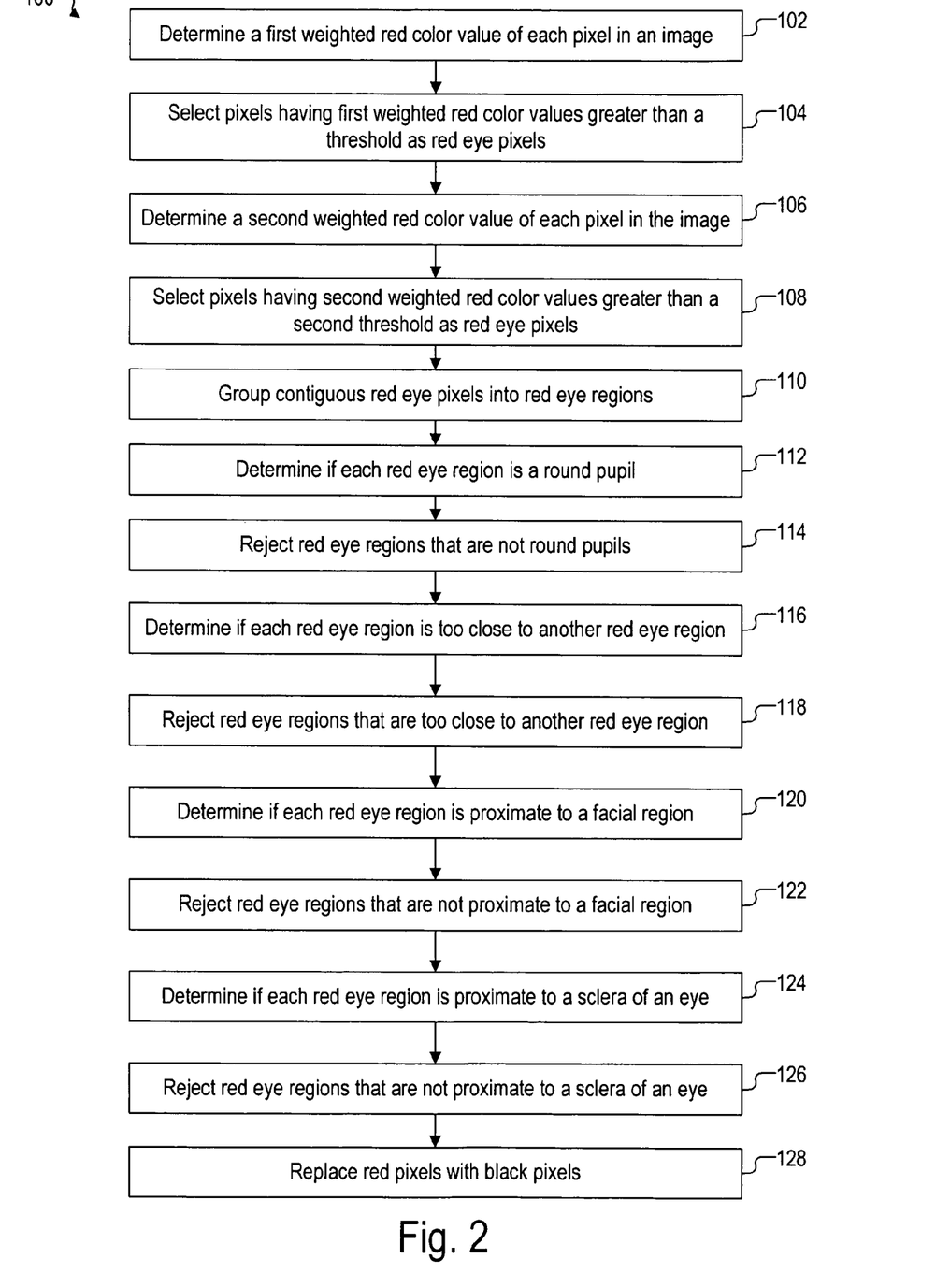
FIG. 2 is a flowchart of a method for red eye removal in one embodiment of the invention.

FIG. 2 is a flowchart of a method 100 for automatically removing red eye from image 10 in one embodiment of the invention. Method 100 does not require the user to designate an area from which the red eye is removed. Method 100 involves low computational complexity and may be implemented in software executed by a computer or firmware embedded into a digital camera, printer, scanner, or mobile phone.

In step 102, the software determines a weighted purple-red value of each pixel in image 10. The weighted purple-red value represents the likelihood that a pixel is a purple-red pixel that forms part of a red eye. In one embodiment for the rgb (red, green, and blue) color space, the weighted purple-red value of a pixel is determined from its red, green, and blue color values, and its luminance as follows:

$$f_1 = \frac{c_1^{(1)}r + c_2^{(1)}g + c_3^{(1)}b}{Y}, \quad (1)$$

where $f_1$ is the weighted purple-red value, r is the red color value, g is the green color value, b is the blue color value, $c_1^{(1)}$ is a weight given to the red color value, $c_2^{(1)}$ is a weight given to the green color value, $c_3^{(1)}$ is a weight given to the blue color value, and Y is the luminance calculated as $Y=a_1r+a_2g+a_3b$. Note that the weighted red value is independent of luminance change. In one embodiment, $c_1^{(1)}$ is 0.5, $c_2^{(1)}$ is 0.5, $c_3^{(1)}$ is −1, and $Y=0.299r+0.587g+0.114b$. In other words, equation (1) can be rewritten as:

$$f_1 = \frac{r + b - 2g}{2Y}. \quad (2)$$

In one embodiment for the YCrCb (luminance, red chrominance, and blue chrominance) color space, the weighted purple-red value of a pixel is determined as follows:

$$f_1 = \frac{1.41514(Cr - 128) + 1.23014(Cb - 128)}{Y}, \quad (3)$$

where Cr is the red chrominance, Cb is the blue chrominance, and Y is the luminance.

In step 104, the software selects the pixels in image 10 that have weight purple-red values greater than a threshold as red eye pixels. In one embodiment, this threshold is 0.5.

In step 106, the software determines a weighted orange-red value of each pixel in image 10. The weighted orange-red value represents the likelihood that a pixel is an orange-red pixel that forms part of a red eye. In one embodiment for the rgb color space, the weighted orange-red value for a pixel is determined from its red, green, and blue color values as follows:

$$f_2 = \frac{c_1^{(2)}r + c_2^{(2)}g + c_3^{(2)}b}{Y}, \quad (4)$$

where $f_2$ is the weighted orange-red value, $c_1^{(2)}$ is a weight given to the red color value, $c_2^{(2)}$ is a weight given to the green color value, and $c_3^{(2)}$ is a weight given to the blue color value. As noted above, the weighted red value is independent of luminance change. In one embodiment, $c_1^{(2)}$ is 0.6667, $c_2^{(2)}$ is 0.3333, $c_3^{(2)}$ is −1.0. In other words, equation (4) can be rewritten as:

$$f_2 = \frac{2r + g - 3b}{3Y}. \quad (5)$$

In one embodiment for the YCrCb color space, the weighted orange-red value of a pixel is determined as follows:

$$f_2 = \frac{0.69662(Cr - 128) - 1.88671(Cb - 128)}{Y}. \quad (6)$$

In step 108, the software selects the pixels in image 10 that have weighted orange-red values greater than another threshold as red eye pixels. In one embodiment, this threshold is 0.5.

Figure 3:
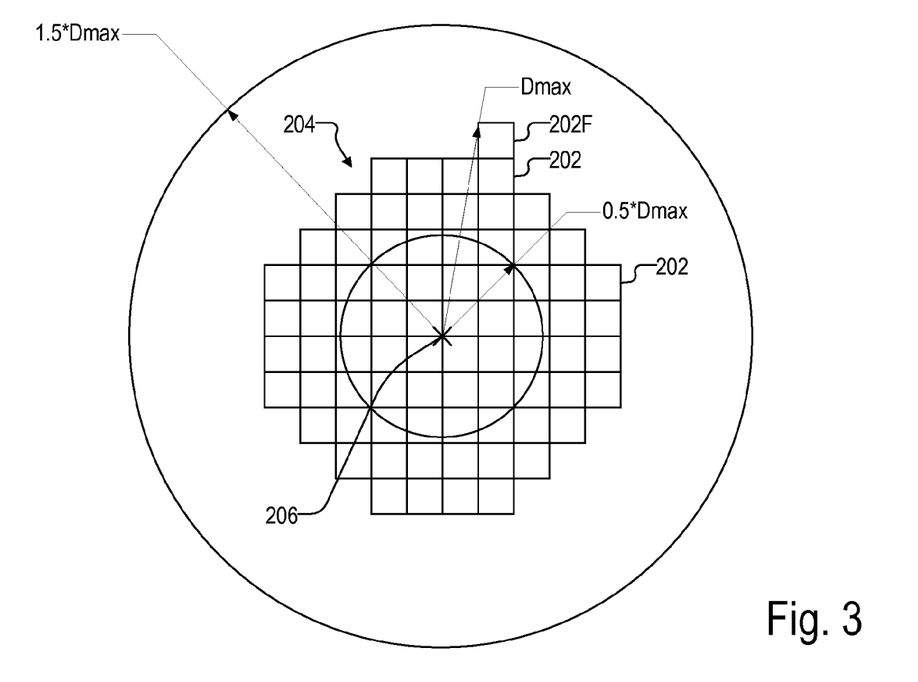
FIGS. 3, 4, and 5 illustrate how a red eye region is determined to be a substantially round pupil with red eye in one embodiment of the invention.

In step 110, the software groups contiguous red eye pixels into red eye regions. Red eye pixels hereafter refer to the purple-red and orange-red pixels selected in steps 104 and 108. A red eye region can contain purple-red pixels, orange-red pixels, or a combination thereof. FIG. 3 illustrates a group of red eye pixels 202 (only a few are labeled) that form a red eye region 204. Although not illustrated, it is understood that other pixels surround red eye pixels 202.

In step 112, the software determines if each red eye region is a substantially round pupil. In step 114, the software rejects the red eye pixels in each red eye region that is not a substantially round pupil. Steps 112 and 114 are illustrated in reference to red eye region 204 in FIGS. 3 and 4 but in actuality are repeated for each red eye region.

First, the software determines the geometric center 206 of red eye region 204. The software then determines the distance $D_{max}$ from geometric center 206 to the farthest red eye pixel 202F. Distance $D_{max}$ is used to set a range of radii of circles where the weighted red values of corresponding pixels located on two adjacent circles are compared. This is illustrated in reference to FIG. 4.

Figure 4:
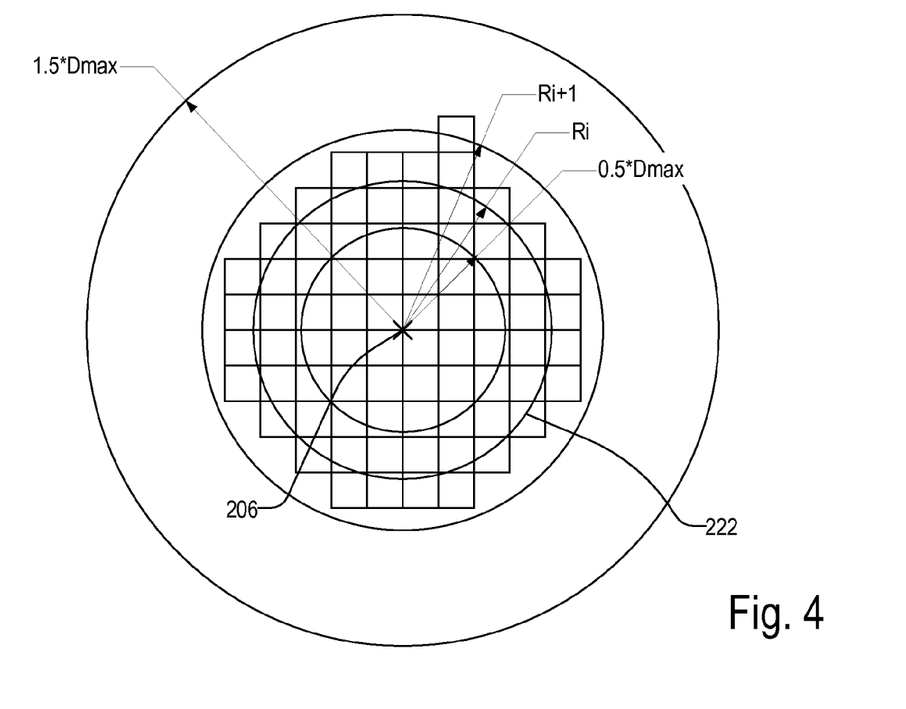

The software first determines the sum of the weighted red values of the pixels located at a first circle having a radius $R_i$ as follows:

$$S(R_i) = \sum_{0 \leq \theta < 360} \mathrm{Max}(f_1(R_i, \theta), f_2(R_i, \theta)), \quad (7)$$

where $S(R_i)$ is the sum of the first circle, $\mathrm{Max}(f1, f2)$ is a function that outputs the greater of a weighted purple-red value $f_1$ and a weighted orange-red value $f_2$, and $R_i$ and $\theta$ are the polar coordinates of a pixel.

The software then determines the sum of the weight red values of the pixels located at an adjacent second circle having a radius $R_{i+1}$.

$$S(R_{i+1}) = \sum_{0 \leq \theta < 360} \mathrm{Max}(f_1(R_{i+1}, \theta), f_2(R_{i+1}, \theta)), \quad (8)$$

where $S(R_{i+1})$ is the sum of the second adjacent circle. In one embodiment, the radius $R_{i+1}$ is radius $R_i$ incremented by 1 pixel, and angles $\theta$ consists 0 to 360° increased at 4° increments (e. 0, 4, 8 . . . 356).

The software then determines the difference between the two sums: $S(R_i) - S(R_{i+1})$. If the absolute value of the difference is small, then there has not been a change in the red color between the pixels on the adjacent circles, which indicates that the image has not transitioned from a pupil having red eye to the eye (e.g., from pupil 14 to eye 16). If the difference is positive, then there has been a decrease in the red color between the pixels on the adjacent circles, which may indicate that the image has transitioned from a pupil having red eye to the eye.

In one embodiment, this process is repeated for radii ranging from $0.5*D_{max}$ to $1.5*D_{max}$ where the radius is incremented at 1 pixel between adjacent circles. After the process is completed for these radii, the software selects the radius of the circle that generates the largest difference with its adjacent circle as the radius of a pupil (hereafter "$R_{pupil}$") having red eye region 204.

Figure 5:
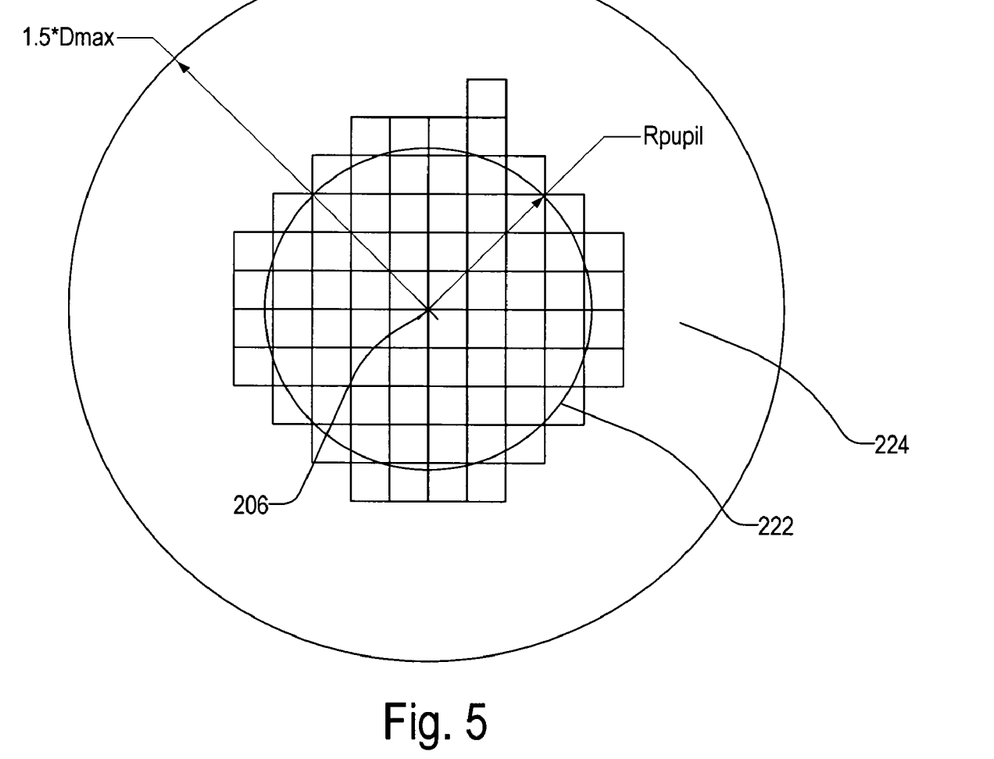

Referring to FIG. 5, the software then determines a first ratio between (1) the number of red eye pixels located within a circle 222 having radius of $R_{pupil}$ and (2) the area of circle 222 in pixels as follows:

$$R_1 = \frac{N_{R_{pupil}}}{A_{R_{pupil}}}, \quad (9)$$

where $R_1$ is the first ratio, $N_{R_{pupil}}$ is the number of red eye pixels within a circle having radius $R_{pupil}$, and $A_{R_{pupil}}$ is the area of the circle in the number of pixels.

The software also determines a second ratio between (1) the number of red eye pixels located within a ring 224 having an inner radius of $R_{pupil}$ and an outer radius of $1.5*D_{max}$ and (2) the area of ring 224 in pixels as follows:

$$R_2 = \frac{N_{R_{pupil}/D_{max}}}{A_{R_{pupil}/D_{max}}}, \quad (10)$$

where $R_2$ is the second ratio, $N_{R_{pupil}}$ is the number of red eye pixels within a ring having an inner radius $R_{pupil}$ and an outer radius $1.5*D_{max}$, and $A_{R_{pupil}/D_{max}}$ is the area of the circle in the number of pixels.

The software then determines a difference between the first ratio and the second ratio: $R_1-R_2$. A large difference indicates that red eye region 204 is probably a pupil with red eye. If the difference is less than a threshold, the software then rejects the red eye pixels in red eye region 204 as candidates for red eye removal. In one embodiment, the threshold is 30% (i.e., 0.3).

In step 116, the software determines if each remaining red eye region is too close to another red eye region. In step 118, the software rejects red eye pixels in each red eye region that is too close to another red eye region. Steps 116 and 118 are illustrated in reference to red eye regions 204 and 242 in FIG. 6 but in actuality are repeated for each red eye region.

Figure 6:
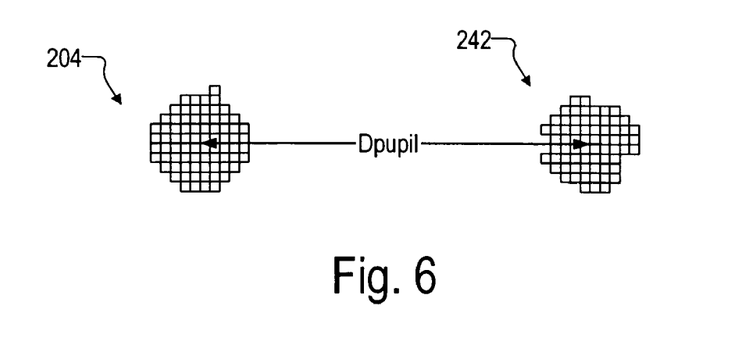
FIG. 6 illustrates how a red eye region is determined to be too close to another red eye region in one embodiment of the invention.

The software determines a distance $D_{pupil}$ between the geometric centers of red eye regions 204 and 242. The software then determines if distance $D_{pupil}$ is within a range that makes red eye regions 204 and 242 too close. In one embodiment, red eye regions are too close if they are within $10*R_{pupil}$ to $14*R_{pupil}$ of each other. The software thus rejects the red eye pixels in red eye regions 204 and 242 as candidates for red eye removal if they are too close to each other.

In step 120, the software determines if each remaining red eye region is proximate to a facial region (e.g., face 20 in FIG. 1). In step 122, the software rejects the red eye pixels in each red eye region that is not proximate to a facial region. Steps 120 and 122 are illustrated in reference to red eye region 204 in FIGS. 7 and 8 but in actuality are repeated for each red eye region.

Figure 7:
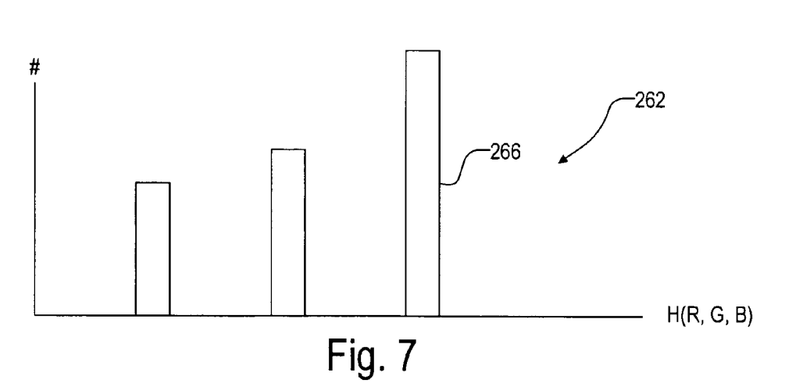
FIGS. 7 and 8 illustrate how a red eye region is determined to be proximate to a facial region in one embodiment of the invention.
Figure 8:
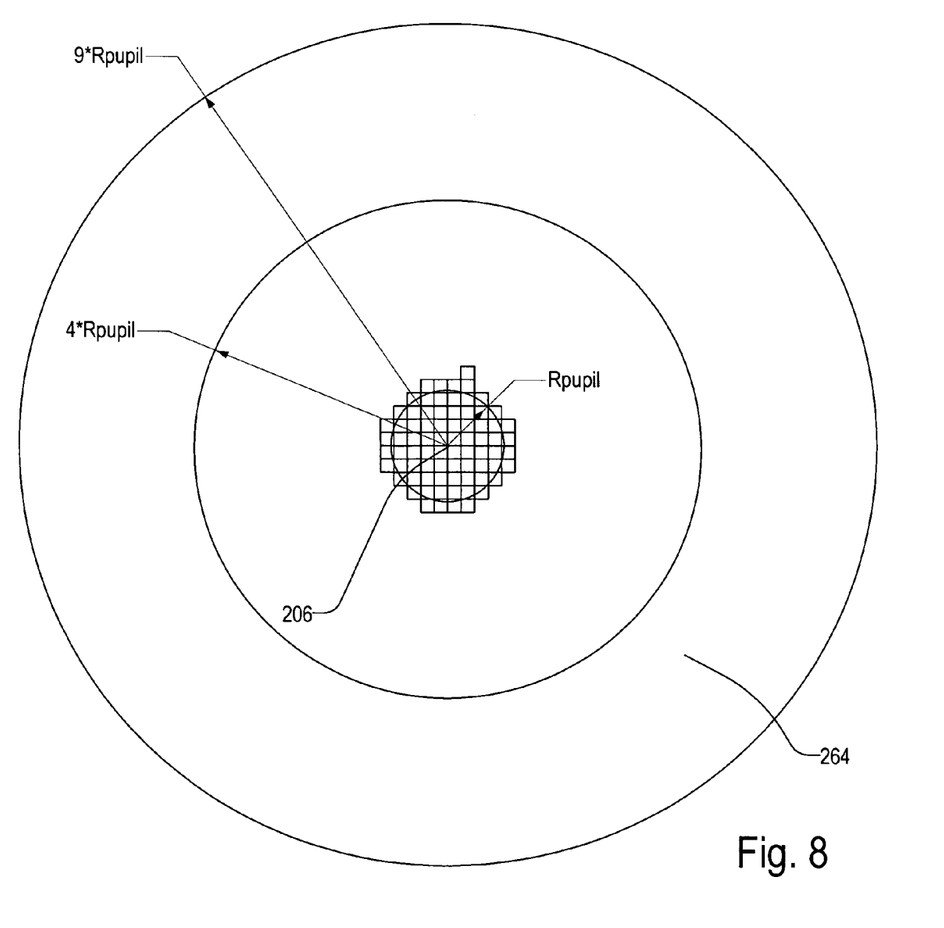

The software first generates a histogram 262 of the pixels located in a ring 264 about geometric center 206. The function of histogram 262 is simply the number of pixels that has a particular color (e.g., a particular combination of Y,Cr,Cb color values). In one embodiment, ring 264 has an inner radius of $4*R_{pupil}$ and an outer radius of $9*R_{pupil}$. The software then selects the most common color 266 in histogram 262 and compares it to a range of threshold skin color values. If color 266 is within the range of threshold skin color values, then red eye region 204 is probably a pupil with red eye that is proximate to a facial region. In one embodiment, the threshold skin color values are expressed in HSV (hue, saturation, value) color space as —80<H<50, 5<S<80, and 20<V<80. Thus, the software first converts the most common color 266 into HSV color space and then compares it with the threshold skin color values. If color 266 is not within the range of threshold skin color values, the software rejects the pixels in red eye region 204 as candidates for red eye removal. In order to remove the luminance change, the luminance (Y) of the image within the circle having radius $9*R_{pupil}$ will be normalized to [0,255] before the software generates histogram 262 and compares color 266 to the range of threshold skin color values. This is because without the normalization, any luminance change will introduce a color cast (i.e., unwanted color effect) into the HSV color space.

In step 124, the software determines if each remaining red eye region is proximate to a sclera of an eye (e.g., sclera 18 in FIG. 1). In step 126, the software rejects the red eye pixels in each red eye region that is not proximate to a sclera of an eye. Steps 124 and 126 are illustrated in reference to red eye region 204 in FIGS. 9 and 10 but in actuality are repeated for each red eye region.

Figure 9:
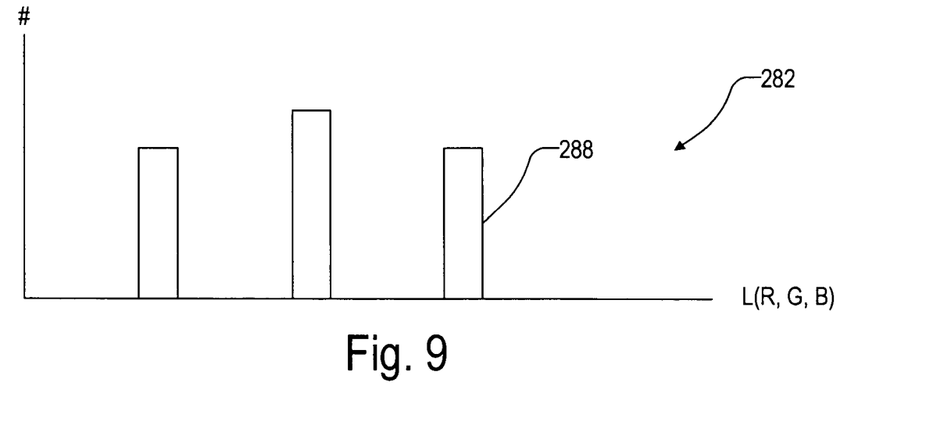
FIGS. 9 and 10 illustrate how a red eye region is determined to be proximate to a white of an eye in one embodiment of the invention.
Figure 10:
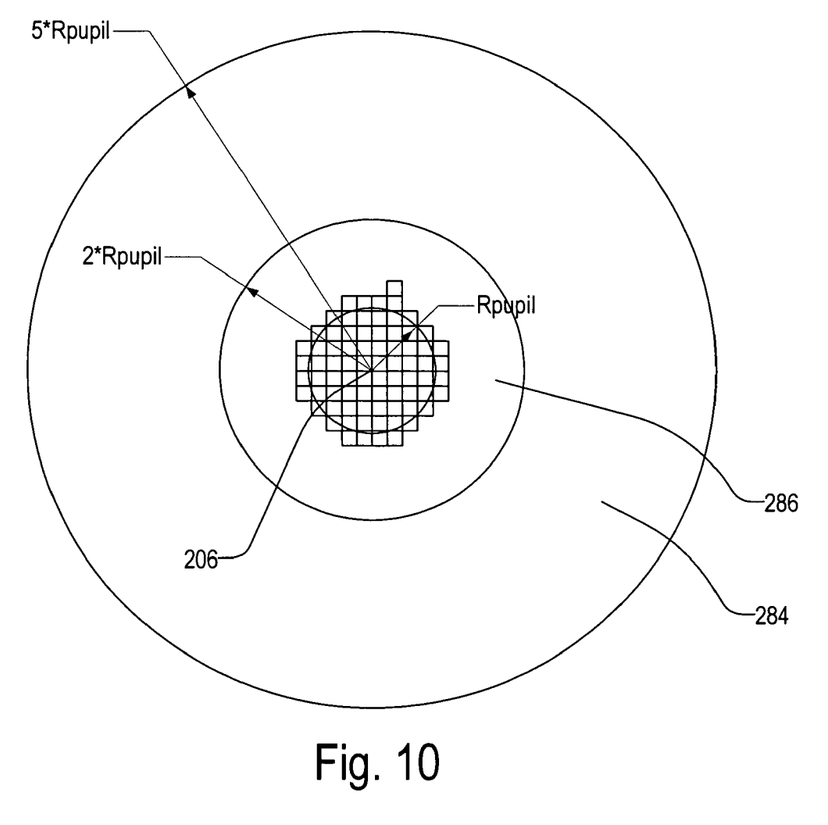

The software generates a luminance histogram 282 of the pixels located in a ring 284 about geometric center 206. In one embodiment, ring 284 has an inner radius of $2*R_{pupil}$ and an outer radius of $5*R_{pupil}$. From histogram 282, the software determines a ratio between (1) the number of pixels having the brightest color 288 in ring 284 and (2) the number of red eye pixels in a circle 286 having a radius of $2*R_{pupil}$ as follows:

$$R_{sclera} = \frac{N_{brightest}}{N_{R_{pupil}}}, \quad (11)$$

where $R_{sclera}$ is the ratio, $N_{brightest}$ is the number of pixels having the brightest color in ring 284, and $N_{2*R_{pupil}}$ is the number of red eye pixels within circle 286 having radius of $2*R_{pupil}$.

If the ratio is greater than a sclera threshold, then red eye region 204 is probably a pupil with red eye proximate to the sclera. If the ratio is less than the threshold, then the software rejects the red eye pixels in red eye region 204. In one embodiment, the sclera threshold is 82% (e.g., 0.82).

In step 128, the software replaces the remaining red eye pixels with black pixels to remove the red eye.

Figure 11:
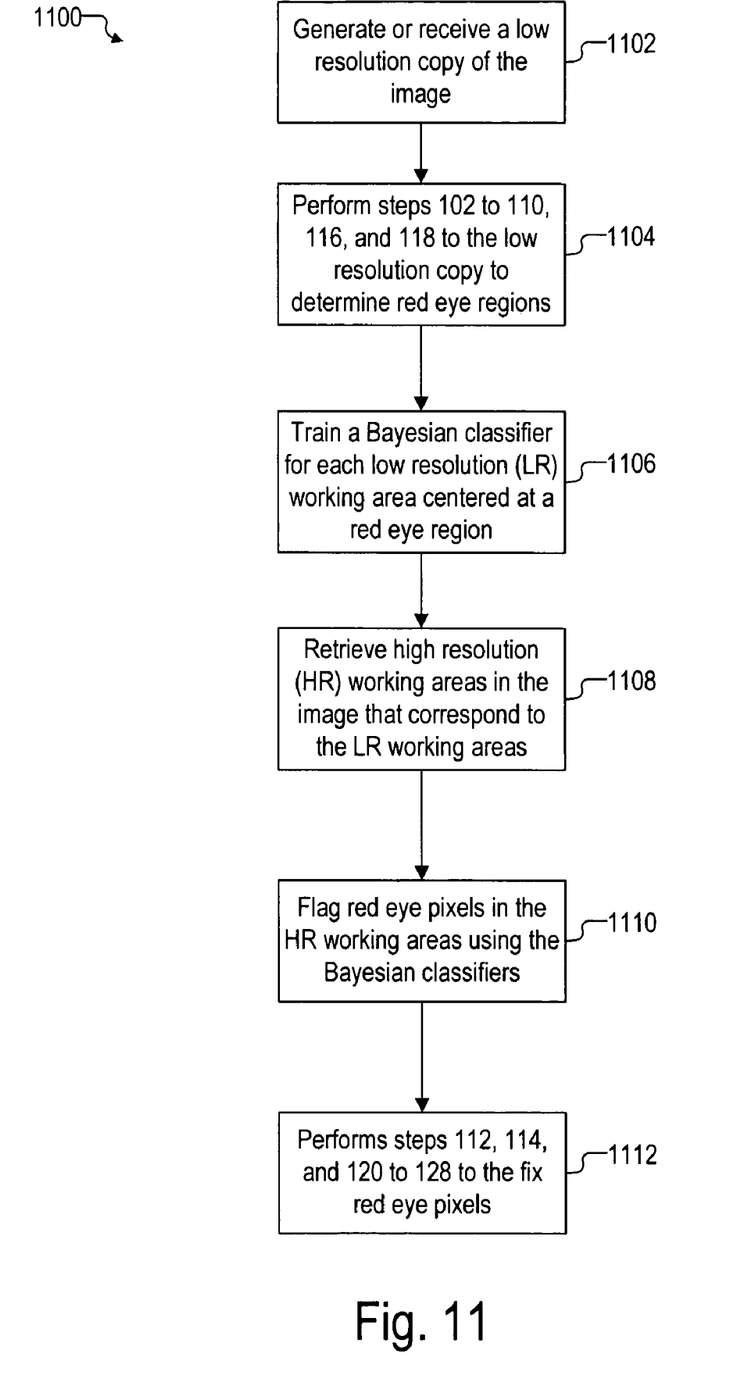
FIG. 11 is a flowchart of a method for red eye removal in another embodiment of the invention.

FIG. 11 is a flowchart of a method 1100 for automatically removing red eye from image 10 in one embodiment of the invention. Method 1100 may be implemented in software executed by a computer or firmware embedded into a digital camera, printer, scanner, or mobile phone. Method 1100 is well suited for a portable device because it uses less computational steps and less random access memory (RAM) than method 100 described above.

Figure 12:
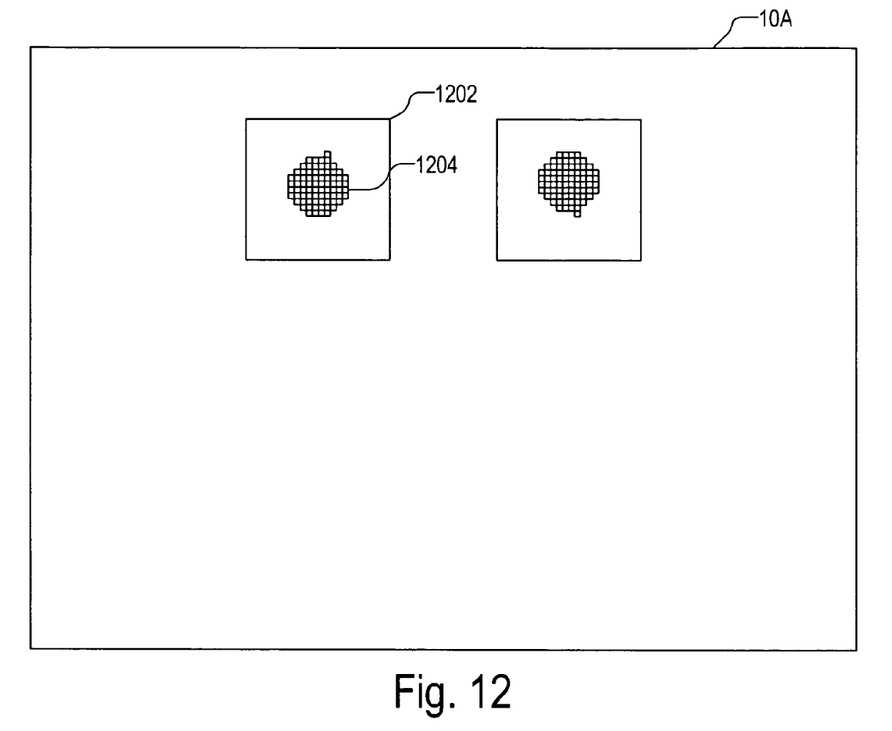
FIGS. 12 and 13 illustrate a low resolution image from which working areas around red eye regions are identified in one embodiment of the invention.
Figure 13:
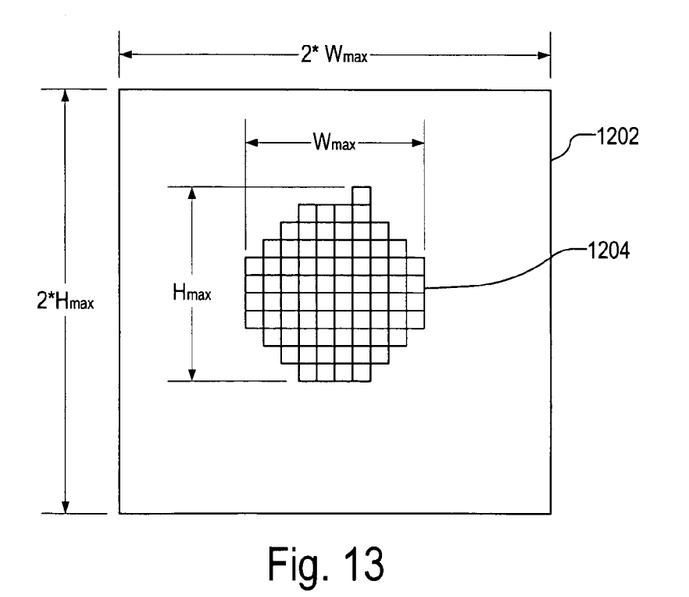

In step 1102, the software generates a low resolution image 10A (FIG. 12) from image 10. Alternatively the software receives low resolution image 10A generated by another component. For example, a digital camera may have built-in hardware or software that generates a preview image from the high resolution image captured by the camera.

In step 1104, the software performs steps 102 to 110, 116, and 118 described above to low resolution image 10A instead of image 10 at full resolution. This saves the computational steps that would otherwise be performed for all the pixels in image 10. Furthermore, this saves the RAM that would otherwise be required for performing the computational steps for all the pixels in image 10.

Specifically, in steps 102 and 104, the software selects pixels in low resolution image 10A that have weighted purple-red values greater than a threshold as red eye pixels (also referred to as "LR red eye pixels"). In steps 106 and 108, the software selects pixels in image 10A that have weighted orange-red values greater than another threshold as red eye pixels (also referred to as "LR red eye pixels"). The thresholds for steps 104 and 108 are selected so they are less discriminatory in order to capture all red eye pixels and some non-red eye pixels. At step 110, the software groups contiguous red eye pixels in image 10A into red eye regions (also referred to as "LR red eye regions").

In step 1106, the software determines working areas around the red eye regions in low resolution image 10A (also referred to as "LR working area"). Each LR working area is centered at the corresponding red eye region. Each LR working area has a width of twice the maximum width ($W_{max}$) of the corresponding red eye region, and a height of twice the maximum height ($H_{max}$) of the corresponding red eye region. For simplicity, only one LR working area 1202 and one red eye region 1204 has been labeled in FIG. 12.

The software then uses the selected red eye pixels and the non-red eye pixels in each LR working area to train a Bayesian classifier for that LR working area. The Bayesian classifier is later used to determine red eye pixels in a corresponding working area in image 10 (also referred to as "HR working area"). The Bayesian classifier for a LR working area is defined as follows:

$$P(x, y)=P(x|y)P(y)=P(y|x)P(x), \quad (12)$$

wherein P(x) is the probability of a pixel taking a weighted red value of x, P(y) is the probability of a pixel being a red eye pixel (i.e., P(y)=1) or a non-red eye pixel (i.e., P(y)=0), P(x,y) is the joint probability that a pixel taking a weighted red value of x and a red-eye pixel value of y, P(x|y) is the conditional probability that a pixel taking a weighted red value of x for a given a red-eye pixel value of y, and P(y|x) is the conditional probability that a pixel taking a weighted red value of y for a given red-eye pixel value of x. In one embodiment, the weighted red value of a pixel is the greater of the purple-red value and the orange-red value of that pixel.

From Equation 12, the probability for a pixel taking a weighted red value of x when that pixel is a red eye pixel can be calculated as follows:

$$P(x,y=1)=P(x|y=1)P(y=1)=P(y=1|x)P(x) \quad (13)$$

which can be rewritten as:

$$P(y=1 \mid x) = \frac{P(x \mid y=1)P(y=1)}{P(x)}. \quad (14)$$

From Equation 12, the probability for a pixel taking a weighted red value of x when that pixel is a non-red eye pixel x can be calculated as follows:

$$P(x,y=0)=P(x|y=0)P(0)=P(y=0|x)P(x), \quad (15)$$

which can be rewritten as:

$$P(y=0 \mid x) = \frac{P(x \mid y=0)P(y=0)}{P(x)}. \quad (16)$$

In one embodiment of the invention, a pixel is assumed to be a red eye pixel when P(y=1|x)>P(y=0|x). This can be rewritten from Equations 14 and 16 as follows:

$$\frac{P(x \mid y=1)P(y=1)}{P(x)} > \frac{P(x \mid y=0)P(y=0)}{P(x)}, \quad (17)$$

which can be rewritten as:

$$P(x|y=1)P(y=1)>P(x|y=0)P(y=0). \quad (18)$$

Thus, the software trains the Bayesian classifiers for the LR working areas by determining probabilities P(x|y=1), P(y=1), P(x|y=0), and P(y=0) for each LR working area.

Figure 14:
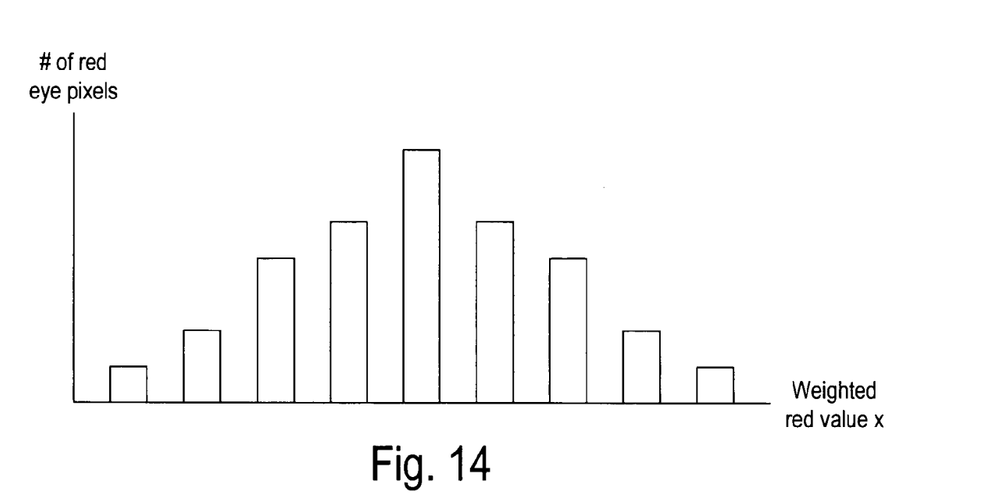
FIGS. 14 and 15 illustrate histograms used to determine probabilities for Bayesian classifiers in one embodiment of the invention.
Figure 15:
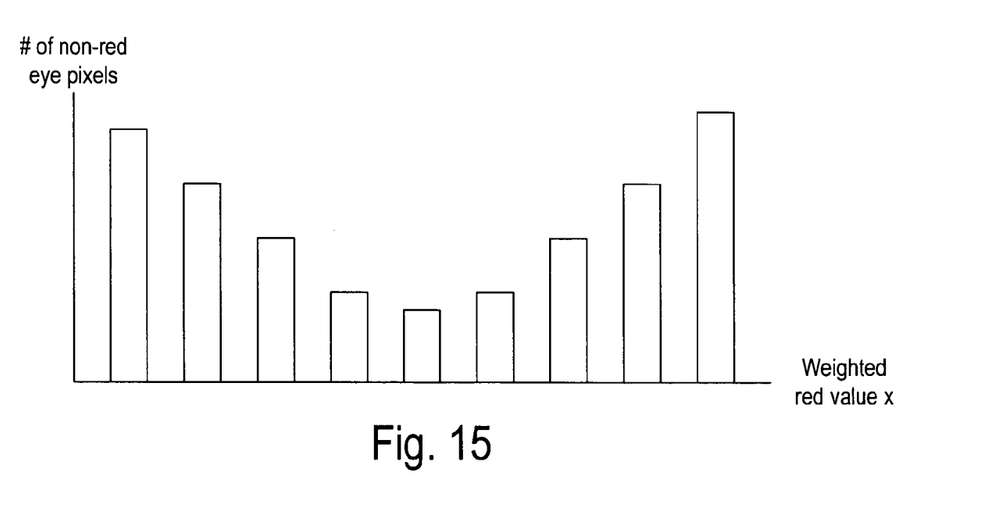

Probability P(x|y=1) can be determined from a histogram of the red eye pixels in the LR working area as shown in FIG. 14. For a given weighted red value x, P(x|y=1) is equal to the number of pixels in the bin for the weighted red value x divided by the total number of red eye pixels in the LR working area. Similarly, probability P(x|y=0) can be determined from a histogram of the non-red eye pixels as shown in FIG. 15. For a given weighted red value x, P(x|y=0) is equal to the number of pixels in the bin for the weighted red value x divided by the total number of non-red eye pixels in the LR working area.

Probability P(y=1) is the total number of red eye pixels divided by the total number of pixels in the LR working area. Similarly, probability P(y=0) is the total number of non-red eye pixels divided by the total number of pixels in the LR working area.

In step 1108, the software retrieves HR working areas in image 10 that correspond to LR working areas in low resolution image 10A.

In step 1110, the software determines the weighted red values of the pixels in each of the HR working area. As discussed above, the weighted red value is the greater of the purple-red value and the orange-red value of that pixel in one embodiment of the invention. From the weighted red values and the determined probabilities for each LR working area, the software applies Equation 18 to identify (e.g., flag) the red eye pixels in the corresponding HR working area (also referred to as "HR red eye pixels"). The software then groups contiguous red eye pixels in the HR working areas search area into red eye regions.

In step 1112, the software performs steps 112, 114, and 120 to 128 described above. Specifically, in steps 112 and 114, the software rejects red eye regions that are not round. In steps 120 and 122, the software rejects red eye regions that are not proximate to a facial region within their HR working areas. In steps 124 and 126, the software rejects red eye regions that are not proximate to a sclera of an eye within their working areas. In step 128, the software replaces the red eye pixels in the remaining red eye regions with black pixels.

Various other adaptations and combinations of features of the embodiments disclosed are within the scope of the invention. Numerous embodiments are encompassed by the following claims.

What is claimed is:

1. A method for removing one or more red eyes, comprising:
    identifying potential red eye pixels in a low resolution image (hereafter "LR red eye pixels"), wherein the low resolution image is generated from a high resolution image;
    grouping the LR red eye pixels that are contiguous into one or more red eye regions (hereafter "LR red eye regions");
    determining working areas around the LR red eye regions in the low resolution image (hereafter "LR working areas");
    training classifiers from the LR working areas;
    retrieving working areas from the high resolution image that correspond to the LR working areas (hereafter "HR working areas");
    applying the classifiers to the HR working areas to identify potential red eye pixels in the HR working areas (hereafter "HR red eye pixels");
    grouping the HR red eye pixels that are contiguous into one or more red eye regions (hereafter "HR red eye regions");
    determining one or more of the HR red eye regions as one or more red eyes; and
    replacing the HR red eye pixels in said one or more red eyes with black pixels.

2. The method of claim 1, wherein said identifying potential red eye pixels in a low resolution image (hereafter "LR red eye pixels") comprises:
    calculating a first weighted red value for each pixel in the low resolution image based on a first set of constants;
    calculating a second weighted red value for each pixel in the low resolution image based on a second set of constants;
    wherein the LR red eye pixels comprise:
        (1) a first plurality of pixels in the low resolution image that have first weight red values greater than a first threshold; and
        (2) a second plurality of pixels in the low resolution image that have second weighted red values greater than a second threshold.

3. The method of claim 2, wherein:
the first weighted red value comprises:

$$f_1 = \frac{c_1^{(1)}r + c_2^{(1)}g + c_3^{(1)}b}{Y},$$

wherein $f_1$ is the first weighted red value, r is a red color value, g is a green color value, b is a blue color value, $c_1^{(1)}$, $c_2^{(1)}$, and $c_3^{(1)}$ are the first set of constants, and Y is a luminance value;

the second weighted red value comprises:

$$f_2 = \frac{c_1^{(2)}r + c_2^{(2)}g + c_3^{(2)}b}{Y},$$

wherein $f_2$ is the second weighted red value, and $c_1^{(2)}$, $c_2^{(2)}$, and $c_3^{(2)}$ are the second set of constants.

4. The method of claim 1, wherein each of the LR working areas is centered about a corresponding LR red eye region, and has a width of twice a maximum width of the corresponding LR red eye region and a height of twice a maximum height of the corresponding LR red eye region.

5. The method of claim 2, wherein each of the classifiers for a corresponding LR working area comprises:
    determining if $P(x|y=1)P(y=1)$ is greater than $P(x|y=0)P(y=0)$, wherein:
        $P(x|y=1)$ is a first probability that any pixel in the corresponding LR working area taking a weighted red value x when that pixel is one of the LR red eye pixels;
        $P(y=1)$ is a second probability that any pixel in the corresponding LR working area is one of the LR red eye pixel;
        $P(x|y=0)$ is a third probability that any pixel in the corresponding LR working area taking the weighted red value x when that pixel is one of non-LR red eye pixels;
        $P(y=0)$ is a fourth probability that any pixel in the corresponding LR working area is one of the non-LR red eye pixels;
    wherein the weighted red value of any pixel in the corresponding LR working area is the greater of the first weighted red value and the second weighted red value of that pixel.

6. The method of claim 5, wherein said training classifiers from the LR working areas comprises, for each of the classifiers:
    determining the first probability $P(x|y=1)$ by:
        generating a first histogram of the LR red eye pixels in the corresponding LR working area;
        from the first histogram, dividing a first number of pixels having the weighted red value x by a first total number of pixels in the first histogram;
    determining the third probability $P(x|y=0)$ by:
        generating a second histogram of the non-LR red eye pixels in the corresponding LR working area;
        from the second histogram, dividing a second number of pixels having the weighted red value x by a second total number of pixels in the second histogram.

7. The method of claim 2, prior to said determining working areas, further comprising:
    for each of the LR red eye regions:
        determining if that LR red eye region is too close to another LR red eye region;
        rejecting that LR red eye region when it is too close to said another LR red eye region.

8. The method of claim 7, wherein said determining if that LR red eye region is too close to another LR red eye region comprises:
    for each radius in a range of radii centered at a geometric center of that LR red eye region, determining a difference between (1) weighted red values of the LR red eye pixels located at a radius and at a range of angles about the geometric center and (2) weighted red values of the LR red eye pixels located at a next radius in the range of radii and at the range of angles;

selecting one radius in the range of radii that provides a largest difference as a pupil radius for that LR red eye region;

wherein that LR red eye region is too close to another LR red eye region if a distance between the geometric center of that LR red eye region and a geometric center of said another LR red eye region is within a range proportional to the pupil radius.

9. The method of claim 2, wherein said determining one or more of the HR red eye regions as one or more red eyes comprises:

for each of the HR red eye regions:
determining if that HR red eye region comprises a substantially round pupil;
rejecting that HR red eye region when it does not comprise the substantially round pupil.

10. The method of claim 9, wherein said determining if that HR red eye region comprises a substantially round pupil comprises:

determining a geometric center of that HR red eye region;
for each radius in a range of radii, determining a difference between (1) weighted red values of the HR red eye pixels located at a radius and at a range of angles about the geometric center and (2) weighted red values of the HR red eye pixels located at a next radius in the range of radii and at the range of angles;
selecting one radius in the range of radii that provides a largest difference as a pupil radius for that HR red eye region;
determining a first ratio of (1) a first number of the HR red eye pixels located in a circle having the pupil radius to (2) an area of the circle;
determining a second ratio of (1) a second number of the HR red eye pixels located in a ring having an inner radius of the pupil radius and an outer radius of a maximum radius in the range of radii to (2) an area of the ring;
determining a difference between the first ratio and the second ratio;
wherein that HR red eye region does not comprise the substantially round pupil when the difference is less than a threshold.

11. The method of claim 2, wherein said determining one or more of the HR red eye regions as one or more red eyes comprises:

for each of the HR red eye regions:
determining if that HR red eye region is proximate to a facial region; and
rejecting that HR red eye region when it is not proximate to the facial region.

12. The method of claim 11, wherein said determining if that HR red eye region is proximate to a facial region comprises:

generating a color histogram of pixels in a ring having inner and outer radii proportional to a pupil radius of that HR red eye region;
selecting a most common color value in the color histogram;
comparing the most common color to a range of threshold skin colors;
wherein that HR eye region is not proximate to the facial region when the most common color is not within the range of the threshold skin colors.

13. The method of claim 12, further comprising determining the pupil radius as follows:

determining a geometric center of that HR red eye region;
for each radius in a range of radii, determining a difference between (1) weighted red values of the HR red eye pixels located at a radius and at a range of angles about the geometric center and (2) weighted red values of the HR red eye pixels located at a next radius in the range of radii and at the range of angles;
selecting one radius in the range of radii that provides a largest difference as the pupil radius for that HR red eye region.

14. The method of claim 2, wherein said determining one or more of the HR red eye regions as one or more red eyes comprises:

for each of the HR red eye regions:
determining if that HR red eye region is proximate to a sclera; and
rejecting that HR red eye region when it is not proximate to the sclera.

15. The method of claim 14, wherein said determining if that HR red eye region is proximate to a sclera comprises:

generating a luminance histogram for pixels in a ring having inner and outer radii proportional to a pupil radius of that HR red eye region;
selecting a brightest color in the luminance histogram;
determining a ratio between a number of pixels in the ring having the brightest color to a number of the HR red eye pixels within a circle having the pupil radius;
wherein that HR red eye region is not proximate to the sclera when the ratio is less than a threshold.

16. The method of claim 15, further comprising determining the pupil radius as follows:

determining a geometric center of that HR red eye region;
for each radius in a range of radii, determining a difference between (1) weighted red values of the HR red eye pixels located at a radius and at a range of angles about the geometric center and (2) weighted red values of the HR red eye pixels located at a next radius in the range of radii and at the range of angles;
selecting one radius in the range of radii that provides a largest difference as the pupil radius for that HR red eye region.

* * * * *